Jan. 18, 1927. S. S. BARKER Re. 16,537
COOP
Original Filed Nov. 14, 1922 2 Sheets-Sheet 1
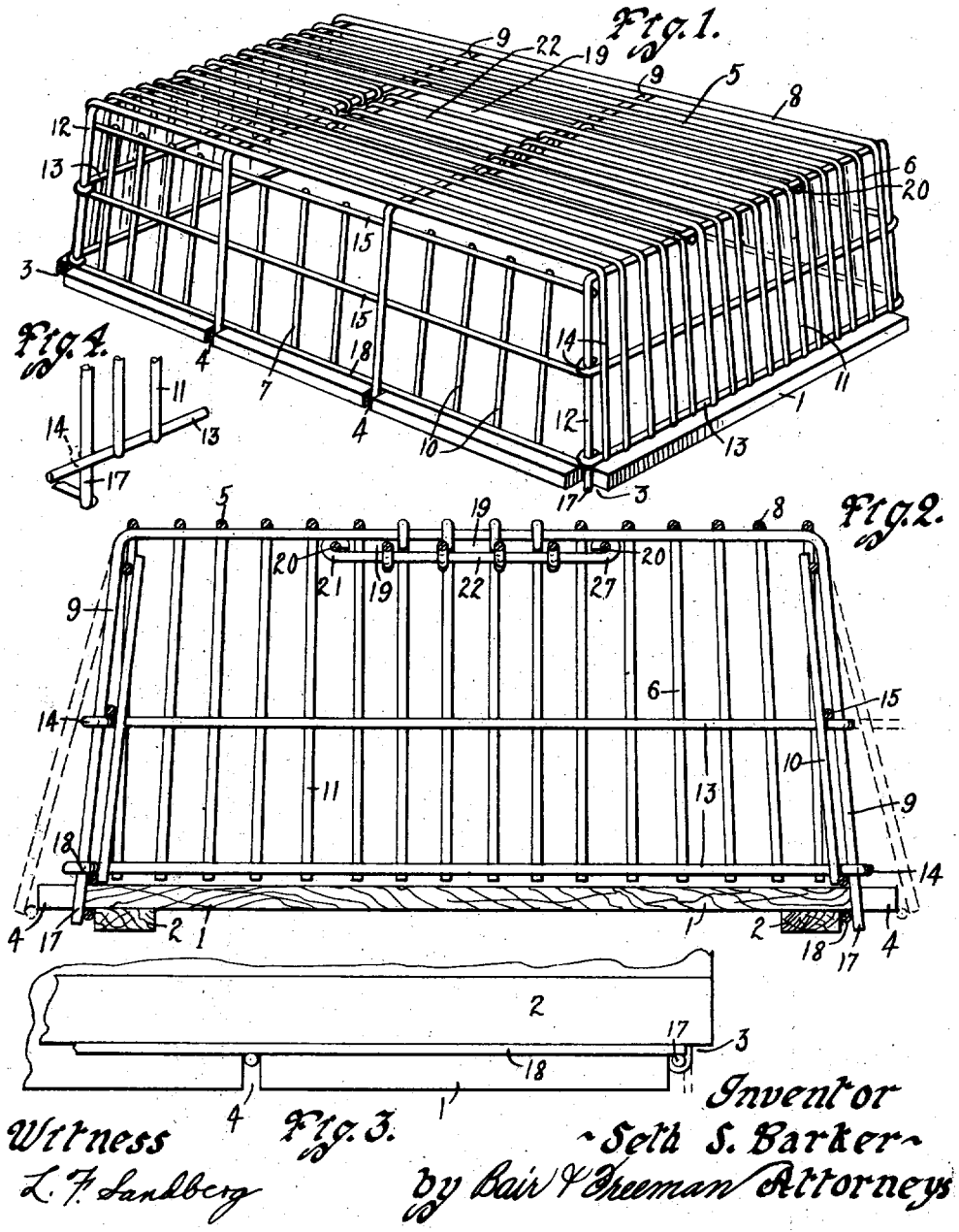
Witness
L. F. Sandberg
Inventor
Seth S. Barker
by Bair & Freeman Attorneys Jan. 18, 1927. Re. 16,537

S. S. BARKER

COOP

Original Filed Nov. 14, 1922 2 Sheets-Sheet 2

Witness
L. F. Sandberg.

Inventor
Seth S. Barker
by Bair & Freeman Attorneys

Reissued Jan. 18, 1927.

Re. 16,537

UNITED STATES PATENT OFFICE.

SETH S. BARKER, OF OTTUMWA, IOWA.

COOP.

Original No. 1,500,792, dated July 8, 1924, Serial No. 600,905, filed November 14, 1922. Application for reissue filed July 2, 1926. Serial No. 120,214.

This invention relates to improvements in shipping coops particularly adapted for shipping poultry or small livestock, although it may be used for any purpose where it would perform its functions in a satisfactory and proper manner.

One object of the present invention is the production of a coop which will be light in weight, but which will possess great strength and durability to withstand the hard usage to which such an article is subjected.

Another object of this invention is the provision of a coop which can be easily and cheaply manufactured and which while having a large storing and shipping capacity will occupy a small amount of space.

Another object of this invention is the provision of a coop which, when found necessary, may be easily taken apart and nested to insure a large saving in shipping space and expense, and which may be readily assembled when found necessary.

Another object of the invention is the provision of a coop which will not present any exterior obstructions which would be likely of contact in shipping and which generally in every important respect will prove useful, efficient and practical.

Another object of my invention is to provide a coop manufactured out of pairs of strands of wire which are arranged one upon another and at angles to each other for forming a top side and end portions of a coop, said portions being formed in flat form whereby the strands of wire may be conveniently assembled before being fabricated and thereafter the side and end portions may be bent at their junction with the top and the adjacent edges of the side and end portions fastened together, with a bottom held in position by the side and end portions of the coop.

Still another object is to provide the ends of some of the wires with fastening hook or eye ends adapted to coact with and extend around other of the wires for fastening the side and end portions of the coop together and holding the coop in position where the sides and ends are substantially at right-angles to the top of the coop and at the same time holding the bottom of the coop in assembled position.

To attain the objects stated and such others as inhere to an invention of this character, the improvement consists of a coop embodying novel features of construction and combination of parts, substantially as shown and defined by the claims, and as illustrated in the accompanying drawings, in which:

Figure 1 represents a perspective view of a complete coop constructed according to this invention.

Figure 2 represents a central transverse sectional view, and

Figures 3 and 4 represent detail views to illustrate certain features of the invention.

Figure 4:
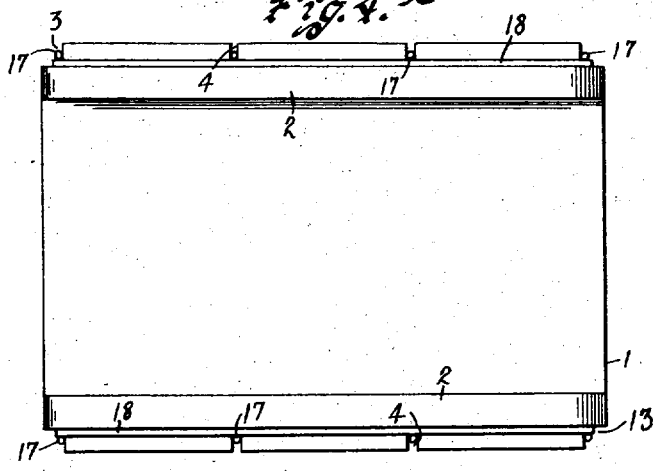

Figure 4× represents a plan view of one of the bottoms used in my coop, and

Figure 5:
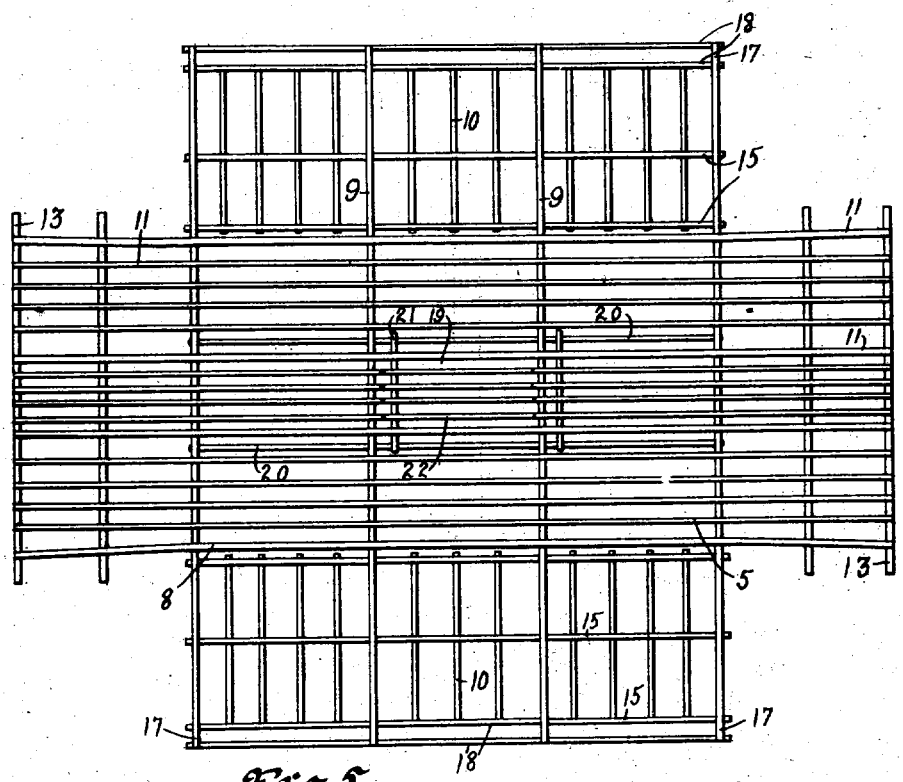

Figure 5, represents a plan view of the coop in blank or flat form, before bending or forming into shape.

Referring by numeral to the drawings, in which the same numbers of reference are used to denote the same parts in the several views:

The numeral 1 designates the bottom of the coop which is preferably made of wood of rectangular outline having the transverse supporting and strengthening strips 2, and provided with the notched or recessed corners 3, and the series of notches or recesses 4 at the sides, the purpose of which will presently appear.

The coop in manufacture is composed of suitable truss-wires and other connecting wires welded together in flat form and then bent into shape to provide the top portion 5, having the end continuations 6, and the sides 7, said top being composed of the longitudinal wires 8, which are connected by intermediate cross or transverse truss-wires 9, said sides being composed of the series of wires 10, and the ends being composed of the series of wires 11, while said ends and sides, are trussed and connected by the bail-shaped end members 12, the horizontal connecting wires 13, having fastening eyes 14, and the pair of side-connecting wires 15, which pass across the side and are connected to the end bail-shaped truss members 12. The intermediate pair of bail-shaped truss members 9, are also provided and said end and intermediate truss members are provided with extended ends 17, which fit in the corner recesses 3 and the intermediate recesses or notches 4, and in connection with the pair of longitudinal wires 18, provide a clamping or securing means for retaining the coop structure upon the bottom, such construction being most clearly shown in Figures 2 and 5.

The top of the coop is provided with an opening 19, at each side of which is disposed the pair of longitudinal guide wires 20, upon which fit the eyes 21, upon the sliding door 22, this construction placing the door below the outer surface of the coop and protecting it from outside contact while allowing ready movement of said door 22.

From the foregoing description, it will be observed that the coop is composed of a series of end and intermediate truss members, and horizontal and vertical wires welded thereto to form the top, ends and sides and that said end members rest upon the top of the bottom of the coop, while said sides have the extensions which provide openings to receive the corner portions and sides of said bottom of the coop, thus producing a coop which can be easily welded in flat form and bent into shape and which will provide a strong and durable structure capable of production at a very low price, and which can be easily shipped and when desired to return in large quantities may be restored to flat form and nested with the flat bottoms. At the time of manufacure, the bottoms and body of the coop being in flat form may be shipped in large quantities by nesting or making into a flat package, thus saving space and naturally shipping expenses.

It will be noted from Figure 5, that the body of the coop consists of the top, the ends which are adapted to be bent in to engage the top of the bottom, which the sides are bent in and have the loops formed by the extended portion thereof for providing a locking engagement with the bottom, thus securing the body rigidly to the bottom.

It will be noted that the eyes or hooks 14 on the wires 13 coact with the wires 12 for connecting the end portions 6 to the side portions 7 of the coop.

The many advantages of this coop will be readily understood by all persons skilled in such structures, and it will be at once apparent that the coop while light in weight will prove durable and withstand hard usage; can be manufactured at a small price; will have large capacity and generally in every particular will prove thoroughly efficient and practical.

One of the most important features of my invention resides in the combination with the bottom formed with the corner and side notches or recesses of the sides having the open extensions which fit over the bottom and having vertical portions which engage said recesses, thus locking the structure to the bottom, while the ends fold inward and clamp against the top of the bottom at each end with their horizontal strands or wires secured to the vertical wires of the sides, this making a strong connection with the bottom and with the sides and ends.

Having fully described the invention, what is claimed is:

1. A coop of the character described, consisting of a bottom having corner and side recesses, a coop having side members formed with depending portions to engage said recesses to lock the coop to the bottom, truss members at the end and intermediate of the coop structure, and a door arranged below said truss members, said ends having eyes to engage the outer vertical rims of the sides and when in upright position bearing against the top of the bottom while the depending portions of the sides have a locking engagement with the corner and side recesses of said bottom.

2. A coop of the character described consisting of a series of vertical truss members having their lower portions extended, a series of longitudinal and vertical wires connected to said truss members to form the top, ends and sides, and a bottom having corner and side recesses and fastened by the extended portions of said truss members, said ends having eyes to engage the outer vertical rims of the sides and when in upright position bearing against the top of the bottom while the depending portions of the sides have a locking engagement with the corner and side recesses of said bottom.

3. A coop of the character described comprising a fabricated wire structure adapted to be bent for defining a top, side and end portions, said wire structure having openings fabricated adjacent the free ends of said side portions for defining loops, a bottom for said coop, said loops being adapted to receive the sides of said bottom as the wire structure is being bent to define the side portions, coacting fastening means on the side and end portions which maintain the structure in assembled position and prevent removal of the loops from the sides of the bottom of the coop.

4. A coop of the character described comprising a fabricated wire structure adapted to be bent for defining a top, side and end portions, said wire structure having openings fabricated adjacent the free ends of said side portions for defining loops, a bottom for said coop, said loops being adapted to receive the sides of the bottom, and coacting fastening means on the side and end portions which maintain the structure in assembled position and prevent removal of the loops from the sides of the bottom of the coop.

5. A coop of the character described comprising a pair of series of spaced wires secured together at substantially right angles to each other for forming a flat fabricated wire structure, said wire structure being adaptable for bending to thereby define a top portion with side portions and end portions integral with the top portion, said wire structure having openings fabricated adjacent its free ends for defining loops, a removable bottom having portions adapted to be supported by said loops, coacting fastening means on said end portions and on said side portions, said fastening means when in operative position holding the side and end portions fixed relative to each other for holding the bottom in position relative to the wire structure.

6. A coop of the character described comprising a wire structure formed of a pair of series of wires secured together at right angles to each other and bent to define top, side and end portions, a pair of spaced retaining wires secured to one series of said wires adjacent each end of the series, a bottom for said coop, said bottom extending between said pairs of spaced retaining wires whereby the bottom is snugly positioned and supported between said pairs of retaining wires for preventing upward or downward movement of the bottom relative to the coop.

7. A coop of the character described comprising a wire structure formed of a pair of series of wires secured together at right angles to each other and bent to define top, side and end portions, a pair of spaced supporting wires secured to one series of said wires adjacent each end of the series, a bottom for said coop, said bottom extending between said pairs of spaced supporting wires whereby the bottom is properly positioned and supported relative to the wire structure when the coop is in assembled position, and coacting fastening means on the sides of the side and end portions of the structure whereby removal of the bottom from the supporting wires is prevented.

8. A coop of the character described comprising a wire structure formed of a pair of series of wires secured together at right angles to each other and bent to define top, side and end portions, a pair of spaced retaining wires secured to one series of said wires adjacent each end of the series, a bottom for said coop, and coacting fastening means on the side and end portions which maintain the coop in formed up position, said bottom extending between said pairs of spaced retaining wires whereby the bottom is snugly positioned and supported between said pairs of retaining wires for preventing upward or downward movement of the bottom relative to the coop.

Des Moines, Iowa, June 22, 1926.

SETH S. BARKER.